(12) United States Patent
Koschany

(10) Patent No.: US 6,808,834 B2
(45) Date of Patent: Oct. 26, 2004

(54) FUEL CELL STACK WITH COOLING FINS AND USE OF EXPANDED GRAPHITE IN FUEL CELLS

(75) Inventor: Petra Koschany, Buchlberg (DE)

(73) Assignee: Manhattan Scientifics, Inc., New York, NY (US)

(*) Notice: Subject to any disclaimer, the term of this patent is extended or adjusted under 35 U.S.C. 154(b) by 230 days.

(21) Appl. No.: 10/181,551

(22) PCT Filed: Jan. 16, 2001

(86) PCT No.: PCT/EP01/00438

§ 371 (c)(1),
(2), (4) Date: Sep. 27, 2002

(87) PCT Pub. No.: WO01/54218

PCT Pub. Date: Jul. 26, 2001

(65) Prior Publication Data

US 2003/0082422 A1 May 1, 2003

Related U.S. Application Data

(60) Provisional application No. 60/176,819, filed on Jan. 19, 2000.

(51) Int. Cl.[7] .......................... H01M 8/04; H01M 8/10; H01M 4/94
(52) U.S. Cl. ............................ 429/26; 429/32; 429/34; 429/38; 429/39; 429/44
(58) Field of Search ............................ 429/26, 34, 38, 429/39, 44, 32

(56) References Cited

FOREIGN PATENT DOCUMENTS

| JP | 01186768 | * | 1/1988 | .......... H01M/12/06 |
|----|----------|---|--------|----------------------|
| JP | 10162842 | * | 11/1996 | .......... H01M/8/02 |
| WO | WO 01/54218 A2 | | 7/2001 | |
| WO | WO 01/54218 A3 | | 7/2001 | |

* cited by examiner

Primary Examiner—Patrick Ryan
Assistant Examiner—Angela J. Martin
(74) Attorney, Agent, or Firm—James Creighton Wray; Meera P. Narasimhan

(57) ABSTRACT

For an improved cooling a fuel cell stack (1) with cooling fins extending around the periphery of the stack, the section of the stack has a somewhat longitudinal shape. In detail, the stack comprises: a plurality of fuel cells electrically connected in series and having equivalent active section areas and circumferences, each fuel cell comprising a laminate of layers, these comprising an electrolyte membrane and catalyst, electrode and gas diffusion layers the functions of which may be combined in any combination in multifunction layers; end and separator plates delimiting each cell; and cooling layers (9) the cooling function of which also may be combined with other layers in respective multifunction layers, the cooling layers each projecting beyond the circumferential outer periphery (14) of the laminate of the outer layers thereby comprising an inner active section area (15) and a peripheral cooling fin area (11). For extending the circumference of the active area (15) and thereby the section of the cooling layer and the area of the fins, the ratio (14:15) of circumference (14) and active area (15) of the stack (1), defined by the geometrical shape of the active area (15), extends the corresponding ratio of a square active area. Also describe is the use of expanded graphite for one or several of the following components of a fuel cell: bipolar plate, electrode, and gas diffusion layer.

11 Claims, 1 Drawing Sheet

FUEL CELL STACK WITH COOLING FINS AND USE OF EXPANDED GRAPHITE IN FUEL CELLS

This application claims the benefit of U.S. Provisional Application No. 60/176,819 filed Jan. 19, 2000 and PCT/EP01/00438 filed Jan. 16, 2001.

BACKGROUND OF THE INVENTION

The invention relates to a fuel cell stack comprising: a plurality of fuel cells electrically connected in series and having equivalent active section areas and circumferences, each fuel cell comprising a laminate of layers, these comprising an electrolyte membrane and catalyst, electrode and gas diffusion layers which functions may be combined in any combination in multifunction layers; end and separator plates delimiting each cell; and cooling layers the cooling function of which also may be combined with other 1 in respective multifunction layers, the cooling layers each projecting beyond the circumferential outer periphery of the laminate of the other layers thereby an inner active area and a peripheral cooling fin area and the ratio of the of circumference and active area of the fuel cells, defined by the geometrical shape of the active area, being greater than the corresponding ratio of a square active area. Such a sort of stack can be derived from U.S. Pat. No. 3,589,942 A.

The need for a cooling system in a hydrogen-air proton exchange membrane (PEM) fuel cell has been a long-standing problem. If the heat rises to a very high temperature level, there exists the danger of drying out the membrane. That results in a loss of ionic conductivity and performance, because of the membrane's need of a high humidity level.

Therefore, fuel cells which have a considerable heat dissipation need a cooling system. For certain applications it is helpful that the cooling system is lightweight and compact, e g. for a mobile system. In all fuel cell applications the cost factor of an additional peripheral system for the fuel cell system is to be considered.

In U.S. Pat. No. 5,595,834 A, a fuel cell stack is described that has a circular cylindrical shape. For cooling, it uses separator plates that extend radially outward from the periphery of the stack to serve the additional function of cooling fins. However, the heat transfer to the cooling fins and further to an air stream is restricted which is a considerable limitation particularly for larger cell areas and high temperature gradients and weights. That is because the cooling area of the ring-shaped cooling fins is not sufficient unless using unduly thick layers and broad rings with the consequence of a large overall weight and volume. Rather, the design of the prior art provides relatively large active section areas where waste heat is produced and only relatively small cross sectional areas to conduct the heat outside, and relatively restricted cooling fin areas. An additional cooling system will be necessary that increases the peripheral aggregates of the total system.

U.S. Pat. No. 5,776,625 A and WO 98/11616 describe similar heat removal schemes. The bipolar plates extend in length or width over the active area of each single cell of the fuel cell stack, forming fins at opposing stack edges or at one stack side, respectively. The concomitant increase in stack surface area allows the stack to be cooled e. g. via air that is blown across its surface by a fan.

U.S. Pat. No. 3,589,942 A mentioned above, in its drawings, shows a fuel cell stack wherein, seen from the perspective of the prism shaped stack, the ratio of the circumference to the active section area of the stack, defined by the geometrical shape of the active section area, exceeds the corresponding ratio of a square base prism, i.e. of the transversal section of a straight parallelepiped with a square base, with the same section area. This provides for a relatively longer circumferential line around each cell and further for a larger fin area in relation to the fin width, with the consequence of a lower heat conduction resistance and a higher heat convection.

However still in the prior art, the ratio of the heat dissipation ability to the heat generation in the active area is not optimal, particularly if using thin and lightweight heat conducting layers. A need exists for a cooling system for fuel cell stacks that is inexpensive, lightweight, compact, and conducts all the waste heat of the reaction process out of the fuel cell stack.

SUMMARY OF THE INVENTION

This invention relates to fuel cell stacks as defined above, and preferably to those composed of air breathing proton exchange membrane fuel cells, more particularly polymer electrolyte membrane fuel cells, that operate with air as a reactant and cooling gas and have cooling layers comprising the external cooling fins. The cooling layers may be part of the single fuel cells and extend parallelly to the flat fuel cell extension. The purpose is to bring out the total heat of the reaction process, at first from the inside of the stack to the cooling fins and further from the cooling fins to ambient air or another cooling fluid.

According to the invention, the material for use in the cooling layer is a foil made of expanded graphite. This material if also used as a gas diffusion material may be mixed with soot. Expanded graphite is known to be a useful material for the electrodes of the fuel cell, for the gas diffusion layer or flow field and for the separator plates (see e.g. EP 0 784 352 A). If used for the cooling layers, the feature becomes important that such foil has a larger specific heat conductivity parallel to the plane of each fuel cell, relative to the density, than the metals, since it is a rather light material. The rather poor heat conductivity orthogonal to that plane is of almost no relevance.

The cooling layer may be an extension of the anode or cathode flow field or of the bipolar plate or may even be an extension of one electrode. Preferably it covers the whole active area.

The geometrical form of the fuel cells, being members of the fuel cell stack or another configuration of one or more cells itself is preferably rectangular, and preferably the length is about 1.5 times the width. More preferaably, the length is 2.5 to 3.5 times the width. It at least has a geometric shape that has a relatively high circumference compared to the area. With this configuration, the distance that the total waste heat transport has to cover is short, and the cross-section depending on the thickness and the extension of the expanded graphite cooling layer, to conduct the heat outside is high enough even if rather thin cooling layers are used. The smaller distance of the rectangular fuel cell is used as a pathway for the heat. The result of this material and shape is that the cell, especially the cooling layer, has less weight than if conventional shapes, like a circle or a square, and/or metal cooling fins are used. And as mentioned, for an equal extending width, the circumferential cooling fin has a larger area for dissipating the heat.

Although not necessary, it will be assumed favourable to use the separator plates, i.e. the bipolar plates separating the single cells in the stack, for the cooling plates. However, there is some difficulty in the structure of the bipolar plate.

The bipolar plate must have enough electric conductivity orthogonal to the plane of the fuel cell That is one reason why most fuel cells use a graphite or metal plate as a bipolar plate. But in order to use the bipolar plate as a cooling fin, the heat (or nearby equivalently the electrical) conductivity parallel to the plane of the fuel cell must be enlarged to bring out all the waste heat of the reaction processes. Therefore, the present invention uses the foil containing expanded graphite that has extremely anisotropic features concerning heat and electrical conductivity. The heat conductivity may be fifty (50) times lager parallel to the sheet plane than orthogonal to that plane.

DETAILED DESCRIPTION OF EMBODIMENTS OF THE INVENTION

Figure 1:
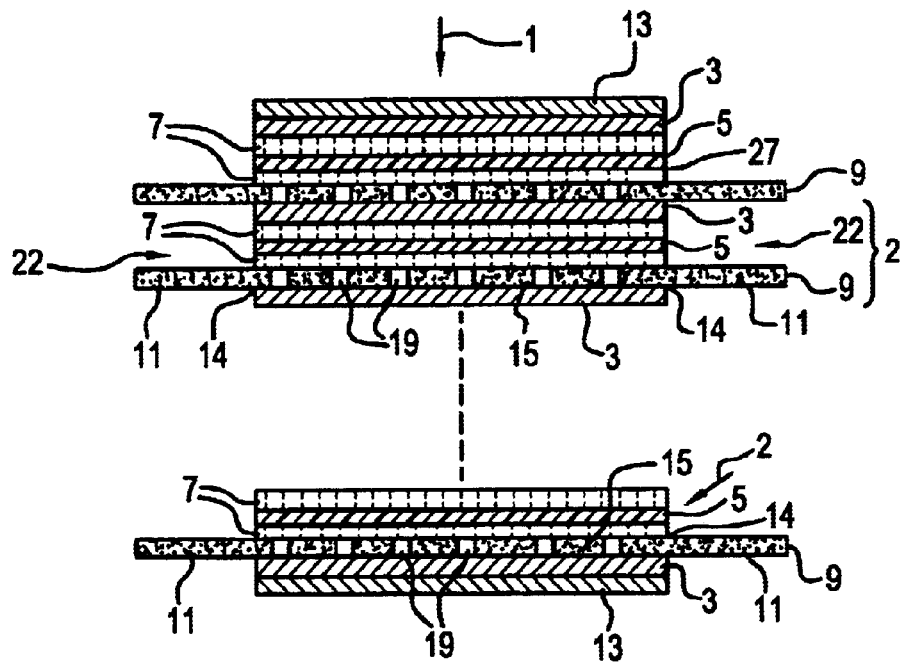
FIG. 1 is a diagrammatic representation of a fuel cell stack with cooling fins.

A polymer electrolyte membrane fuel cell stack 1 consists of a series of single fuel cells 2 separated by bipolar plates 3. Each fuel cell 2 comprises a catalysed membrane 5 to which at both sides a combined gas diffusion and electrode layer 7 is laminated. Between one of the layers 7 of each cell 2 and the associated bipolar plate 3, a cooling layer 9 consisting of expanded graphite is inserted that conducts all the waste heat out of the fuel cell, and transfers this heat outside of the cell first to a cooling fin 11 which is a more or less broad rim of the layer 9 outside of the proper stack and from there to ambient air or another cooling fluid, as shown in FIG. 1. End plates 13 form layers at the opposite ends of the fuel cell stack 1.

The geometrical form of the fuel cells 2, being members of the fuel cell stack 1 or of an equivalent configuration of one or more cells, is shown to be longitudinally rectangular, but at least has a geometric shape that has a relatively high circumference 14 compared to the cell area which is the active, transversal section area 15 of the stack. Another possible section shape is e.g. an ellipse. With such configuration, the distance that the total waste heat has to pass through is short, and the cross-section within the cooling layer to conduct the heat outside is high enough even if rather thin cooling layers 9 are used. The small distance from the place of heat generation in the active area 15 to the fin 11 in the rectangular fuel cell is used as a pathway for the heat, and the result of this shape is that the stack 1, and especially its cooling layers 9, has/have less weight than if conventional shapes, like a circle or a square, are used. Further, for an equal width of the circumferential fin 11, the area of the fin 11 relatively to the active area 15 is larger.

Figure 2:
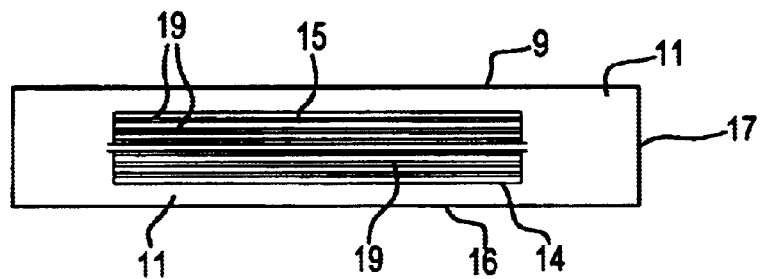
FIG. 2 is a diagrammatic plan view representation of a cooling fin with gas channels.
Figure 3:
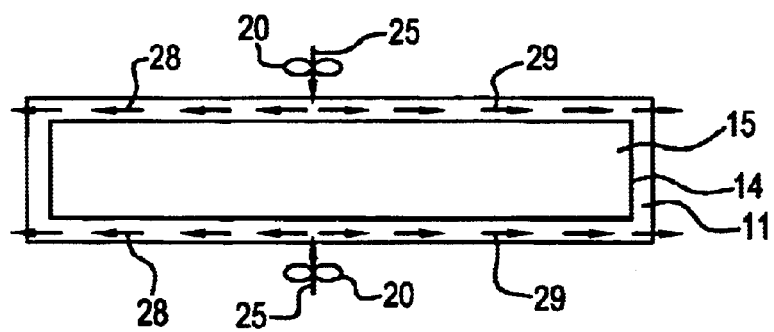
FIG. 3 is a diagrammatic representation of a heat removing system with a cooling fin and a blower.

The geometrical form of the cooling layers 9 is shown In FIG. 2 to also have rectangular shape, and has a length 16 and a width 17. The length 16 of the cooling layer 9 extends the length of the active area 15 of the fuel cells 2, as shown in FIGS. 1 and 3, and the width 17 of the cooling layer 9 extends the width of the active area 15, leading to the circumferential rim-like cooling fin 11 extending around tile cell circumference 14. FIG. 2 farther shows the cooling layer 9 to have parallel channels 19 serving as ducts for reaction gas which usually is air which could be pumped into the channels by a (non-depicted) air pump perhaps via a filter A blower 20 shown in FIG. 3 serves for cooling the cooling fins 11 around the stack 1. The blower 20 can be mounted on an extension of the plate 13 or on some mounting legs, not shown. It transports the cooling air through gaps 22 formed between subsequent cooling fins 11.

FIG. 1 shows the fuel cells 2 with the cooling and gas distribution layers 9 on the cathode side. The anode or the cathode or both layers nay be designed in that way.

The material of the cooling lays 9 has the following properties. In order to remove the beat parallel to the cell area, the material used has high heat conductivity ($\lambda$), and low density ($\rho$) in order to save weight. A number that characterizes that property of the material is the ratio $\lambda/\rho$. The used material, i.e. expanded graphite, compared to several other materials and their properties is shown in Table I.

TABLE I

| Pure Element | Heat Conductivity (W/m K) | Density (g/cm$^3$) | $\lambda/\rho$ (W cm$^3$/m K g) |
|---|---|---|---|
| Foil made of expanded graphite (i.e., Sigraflex from SGL Carbon AG) | 165 (parallel) 3 (orthogonal) | 1.1 | 150 |
| Cu | 401 | 8.96 | 44.8 |
| Ag | 429 | 10.5 | 40.9 |
| Al | 237 | 2.7 | 87.8 |
| Ti | 21.9 | 4.5 | 4.9 |
| Be | 201 | 1.85 | 108.6 |
| Graphite | 150 | 2.0 | 75 |
| Mg | 156 | 1.74 | 89.6 |
| Ca | 125 | 1.55 | 80.6 |
| Li | 84.8 | 0.534 | 158.8 |

Alkali metals, especially Lithium, have a very desirable $\lambda/\rho$ ratio, but because of their chemical reactivity and poor mechanical properties they are not desirable as construction materials. Beryllium has very good properties too, but it is rather toxic. Al, Mg and expanded graphite are some of the remaining materials. Al is a commonly available material. However, Al is chemically unstable at fuel cell conditions.

The material that has the most benefits is a foil that contains expanded graphite. In order to enhance the mechanical stability and the gas tightness (if needed) of this material, it may be impregnated with conventional resins (epoxy, phenol, phenolic, or furan resin). The electric conductivity of the material is, despite of its anisotropicity, high enough to conduct the electric current of the cells.

With the extended cooling fins described, it is possible to bring out all the waste heat of the reaction processes. Except for the blower 20, no additional cooling aggregates are necessary. In the special case of a very small fuel cell area, even the blower may be left off This helps to reduce the peripheral aggregates of the whole system and saves costs.

EXAMPLE 1

In the special form described above the cooling layer 9 also has the function of a gas distribution layer (flow field). A foil with expanded graphite is used (e g., Sigraflex from SGL Carbon AG), which is of a material having an extremely high heat conductivity (see Table I) in the parallel direction and wherein it is easily possible to press or manufacture in another way the gas-channels 19, because the material is soft and deformable due to low content or absence of polymeric binders.

The pressing process has two results. One is that the foil is compressed for forming the channels. This means that the density of the material in the channels is higher. For this special material the heat conductivity parallel to the plane of the fuel cell increases with the density of the material. The channels 19 within the cooling layer 9 therefore do not have a negative but rather a slightly positive effect on the heat conductivity.

The second result is that all channel structures also have parts, i.e. hills, that are higher than the channels. These parts have the function of conducting the electricity orthogonally to the plane of the cells 2 because of the series connection in the fuel cell stack 1. The electric conductivity decreases in the direction orthogonally to the plane of the cells 2 with the density of the material, but high conductivity is needed at those parts only where the material is not compressed. So the effect on the paths for the electric conductivity is not a negative one due to such manufacturing process of the channels 19. In summary, in consequence of the channel structure 19, the heat conductivity is increased, while the electrical conductivity is constant.

EXAMPLE 2

In this embodiment of the present invention the cooling layers 9 fulfil the requirements of the bipolar plates 3 being gas separators, too, and thus must be gas-tight. This embodiment may be with or without a channel structure as described above.

To overcome the problem with conventional bipolar plate materials that are not useful to bring out all the waste heat parallel to the plane of the cell because of no enhanced heat conductivity in this direction, the same advanced material as in Example 1 is used. To fulfil the requirement of gas-tightness, the foil with expanded graphite has to be impregnated or extremely compressed. As an impregnation material a polymer could be used, preferred an epoxy, furan or phenol resin.

In this example, the fuel cells 2 in the stack 1 with the bipolar separator plates 3 also serving as the cooling layers 9 have the following geometrical data:

| | |
|---|---|
| Active area of each cell: | 39 mm · 120 mm |
| Extension of the cooling fin 1 outside of the circumference 14 and of the active area 15: | 20 mm |
| Thickness of the expanded graphite foil: | 0.6 mm (i.e., Sigraflex from SGL) |
| Density of the foil (achieved by compression) | 1.3 g/cm$^3$ |
| Power density: | 0.3 W/cm$^2$ |

The stack 1 has thirty-six (36) of these cells 2 and has a power output of about 500 W. If rather deep channels 19 are required, the thickness of the layer 9 may be enhanced in the active area. The thickness and the mass of the cooling layers 9 still are even smaller than that of liquid cooled systems and all the peripheral aggregates with respect to liquid cooling are eliminated.

EXAMPLE 3

In another embodiment, the cooling layer 9 again has a double function. In addition to working as a cooling fin, the cooling layer 9 also acts as the electrode. The combined electrode and cooling layer may have the pressed gas channels 19 as described, and preferably the layer is also gas permeable.

Again, a foil made of expanded graphite is used. The permeability may be reached by using expanded graphite that has a low density, which means that during manufacturing of the foil a low compression force was applied. This gas permeability is only necessary within the active area 15 of the fuel cell 2. To prevent gas losses due to the gas permeability parallel to the foil layer, the material in the cooling fin part 11 may be compressed. Another way to reach a gas impermeability at the cooling fin part 11 (or at least at the transition, i.e. the circumference 14, between active area 15 and cooling fin 11) is to impregnate that part with a polymer, preferably an epoxy, furan or phenol resin.

To reach higher gas permeability in the active area of the foil, in the step before the manufacturing of the foil from the carbon powder mixture the expanded graphite powder may be mixed with a high pore volume soot. The mixing rate may be 90 parts of expanded graphite or less and 10 parts of soot or more, preferred is a ratio of 60:40.

To improve the contact between the electrode/cooling layer and the membrane 5, a micro-porous layer may be fitted on the side of the electrode adjacent to the membrane. In FIG. 1, the place of such micro-porous layer is shown at 27. Such a micro-porous layer may be made of soot and a hydrophobic material, i.e., polytetrafluoroethylene (PTFE). The connection between the electrode/cooling layer and the micro-porous layer may be obtained by any known coating method, preferably by spraying a suspension onto the surface of the electrode/cooling layer.

EXAMPLE 4

In another embodiment, one or more of the blowers 20 are added to the fuel cell stack 1. They fulfill the task of removing the heat from the cooling fins 11, passing through the gaps 22 formed between subsequent cooling fins 11. The geometrical arrangement of the blowers 20 is important.

Due to the rectangular sectional shape of the fuel cell stack 1, the pathway for the cooling air 25 parallel to the length is rather long. This results in a relatively high pressure drop within the cooling air path, thereby requiring a high power. To overcome this problem, the flow of the cooling air 25 is divided in at least two directions of pathways 28 and 29 for each long side 16 of the rectangular section, these pathway flows cooling different parts of the cooling fins 11. The flow amount and the flow rate are reduced within each gap 22 formed by the subsequent cooling fins. Therefore the pressure drop is reduced quadratically as a function of the number of pathways 28 and 29. FIG. 3 is shows such embodiment of the heat removing system, using the cooling fins 11 together with the blower 20 which may be arranged at the width sides 17 of the rectangle as well.

In another embodiment of Example 4, the blower 20 is replaced by the air stream generated due to the running of a vehicle.

Also in another embodiment of the present invention, the blower may be dispensed with. In this embodiment, the cooling air flow results only because of convection. This is possible for rather small stacks or for stacks with low power output per unit active area only.

What is claimed is:

1. A fuel cell stack comprising: a plurality of fuel cells electrically connected in series and having equivalent active section areas and circumferences, each fuel cell comprising a laminate of layers, these comprising an electrolyte membrane and catalyst, electrode and gas diffusion layers the functions of which may be combined in any combination in multifunction layers; end and separator plates delimiting each cell; and cooling layers the cooling function of which also may be combined with other layers in respective multifunction layers, the cooling layers each projecting beyond the circumferential outer periphery of the laminate of the other layers thereby comprising an inner active section area and a peripheral cooling fin area, wherein the ratio (14:15) of circumference and active area of the stack, defined by the geometrical shape of the active area, being greater than the corresponding ratio of a square active area, wherein the material of the cooling layers is a foil made of expanded graphite, which foil has a larger specific heat conductivity parallel to the plane of each fuel cell than orthogonal to that plane.

2. The fuel cell stack or claim 1, wherein an essentially rectangular active section area has a length exceeding the width by a factor of at least 1.5.

3. The fuel cell stack of claim 2, wherein an essentially rectangular active section area has a length exceeding the width by a factor of between 2.5 and 3.5.

4. The fuel cell stack of claim 1, wherein the cooling layers, in combination, also are the anodic and/or the cathodic electrodes.

5. The fuel cell stack of claim 1, wherein the cooling layers, in combination, also are the anodic and/or the cathodic gas diffusion layers.

6. The fuel cell stack of claim 1, wherein the cooling layers, in combination, also are the separator plates.

7. The fuel cell stack of claim 1, wherein the cooling layers have a channel structure in being provided with gas channels within the active section area.

8. The fuel cell stack of claim 1, wherein it comprises means for generating an enforced airflow traversing over the cooling fin areas of the cooling layers.

9. The fuel cell stack of claim 8 wherein the forced airflow is divided in at least two partial flows each traversing over a part of the cooling fin area.

10. The fuel cell stack of claim 8 wherein the airflow is supported partly or completely by the dynamic and/or static pressure of the ambient air with respect to a moving vehicle.

11. The fuel cell stack of claim 1, wherein the expanded graphite contains some distributed soot.

\* \* \* \* \*